United States Patent
Japikse

(10) Patent No.: US 7,640,745 B2
(45) Date of Patent: Jan. 5, 2010

(54) HIGH-PRESSURE FLUID COMPRESSION SYSTEM UTILIZING CASCADING EFFLUENT ENERGY RECOVERY

(75) Inventor: David Japikse, Woolwich, ME (US)

(73) Assignee: Concepts ETI, Inc., White River Junction, VT (US)

( * ) Notice: Subject to any disclaimer, the term of this patent is extended or adjusted under 35 U.S.C. 154(b) by 309 days.

(21) Appl. No.: 11/623,153

(22) Filed: Jan. 15, 2007

(65) Prior Publication Data

US 2008/0169246 A1  Jul. 17, 2008

(51) Int. Cl.
*F02B 33/44* (2006.01)
(52) U.S. Cl. ............................. 60/605.1; 60/612
(58) Field of Classification Search ............ 60/605.1, 60/612
See application file for complete search history.

(56) References Cited

U.S. PATENT DOCUMENTS

| | | | |
|---|---|---|---|
| 5,142,866 A | * | 9/1992 | Yanagihara et al. ......... 60/605.2 |
| 5,384,051 A | | 1/1995 | McGinness |
| 5,405,533 A | | 4/1995 | Hazlebeck et al. |
| 5,471,834 A | | 12/1995 | Kapich |
| 5,591,415 A | | 1/1997 | Dassel et al. |
| 6,112,523 A | * | 9/2000 | Kamo et al. .................. 60/612 |
| 6,255,529 B1 | | 7/2001 | Nagase et al. |
| 6,279,550 B1 | | 8/2001 | Bryant |
| 6,324,846 B1 | * | 12/2001 | Clarke ....................... 60/605.2 |
| 6,462,230 B1 | | 10/2002 | Nagase et al. |
| 6,470,683 B1 | | 10/2002 | Childs et al. |
| 6,519,926 B2 | | 2/2003 | Hazlebeck |
| 6,557,345 B1 | * | 5/2003 | Moeckel ....................... 60/599 |
| 6,571,552 B2 | | 6/2003 | Ban et al. |
| 6,808,179 B1 | | 10/2004 | Bhattacharyya et al. |

OTHER PUBLICATIONS

N. Watson, M.S. Janota, "Turbocharging the Internal Combustion Engine," Wiley-Interscience Publication, John Wiley & Sons, 1982, pp. 392-397.

* cited by examiner

*Primary Examiner*—Hoang M Nguyen
(74) *Attorney, Agent, or Firm*—Downs Rachlin Martin PLLC

(57) ABSTRACT

A high-pressure system and method utilizing an input fluid. The system includes a reactor treating a material to produce an effluent having an energy content, a plurality of stages compressing the input fluid in a stepwise manner providing a high-pressure reactor input stream to the reactor, and a cascading effluent energy recovery system mechanically communicating with the plurality of stages. The cascading effluent energy recovery system imparts a portion of the energy content of the effluent into each of the plurality of stages powering that stage. The method includes receiving an input fluid, compressing the input fluid over a plurality of stages producing the high-pressure stream, providing the high-pressure stream to the reactor, recovering a portion of the energy content of the effluent at each of the plurality of stages, and using each the portion of the energy in compressing the input fluid at a corresponding respective stage.

43 Claims, 2 Drawing Sheets

HIGH-PRESSURE FLUID COMPRESSION SYSTEM UTILIZING CASCADING EFFLUENT ENERGY RECOVERY

FIELD OF THE DISCLOSURE

The present disclosure generally relates to the field of pressurizing systems for use in thermo-chemical processes. In particular, the present disclosure is directed to a high-pressure compression system utilizing cascading effluent energy recovery.

BACKGROUND

High-pressure air and steam are used in various industrial applications. For example, extremely high-pressure air may be used on submarines for clearing main ballast tanks. High-pressure water vapor (commonly referring to water molecules with or without air or other gas molecules present) can also be used to create a very effective high-pressure chemical reaction with a purpose of reducing various components of the reaction down to their fundamental constituents of water and carbon dioxide. For example, this technique is used in the process of supercritical water oxidation (SCWO), wherein diverse waste streams, including sewage, commercial waste, old munitions, and the like, are converted to basic oxidized constituents with minimal harmful waste effluent from the process.

Conventional forms of compression for such high-pressure applications have been accomplished with positive displacement compressors originally designed for submarines and that provide pressures in the order of 5,000 psi. Such conventional compressors limit the possibilities of efficient recapture of waste energy and reinsertion of the energy back into the cycle.

Various processes for treating a feedstock require process materials to be maintained at elevated pressures. Additionally, conventional processes may require the feedstock to be at an elevated temperature. In such treatment processes, obtaining a high-pressure rise with minimum energy consumption presents a continuing problem. One of the efforts to recover waste energy in current systems involves the use of conventional turbines to expand the high-pressure gas effluent stream once the reaction is complete. The energy recaptured is then delivered to an electric generator. The electric power created in the generator is either used to drive the high-pressure positive displacement compressors or is returned to the grid.

Inefficient use of waste energy has been particularly acute in the hydrothermal treatment of organic waste products using SCWO techniques. In a typical SCWO process, the materials in a reaction chamber are preferably maintained at a pressure of over 200 bar and a temperature of over 700° Celsius. Processes may have a preferred reaction pressure of 1000 bar. Conventional positive displacement compressors, as described above, are used to help achieve such high-pressures in the reaction chamber.

In SCWO processes, oxidation of waste organics can be achieved by pumping an oxidizer, such as air, into the reaction chamber for mixing with other constituents of the reaction, such as supercritical water, raw wastes, and additives such as a fuel to assist in maintaining suitable temperatures. Such processes are described in U.S. Pat. No. 4,338,199 issued to Model on Jul. 6, 1982, U.S. Pat. No. 5,106,513 issued to Hong on Apr. 21, 1992, and U.S. Pat. No. 6,519,926 issued to Hazlebeck on Feb. 18, 2003, which are all hereby incorporated by reference in their entirety.

Multiple stage turboccharging of internal combustion engines is a technique well known in the art. For examples, such multiple stage turbocharging of internal combustion engines may be found in U.S. Pat. No. 7,000,393 issued to Wood et al. Additionally, multiple stage turbocharging of internal combustion engines is also provided in *Turbocharging the Internal Combustion Engine,* by N. Watson and M. S. Janota, at sections 11.5 and 11.6, published by Wiley-Interscience Division, John Wiley & Sons, Inc., New York (1982). However, the recovery of energy in such conventional systems has generally been inefficient.

SUMMARY OF THE DISCLOSURE

In one embodiment of the present disclosure, a system utilizing an input fluid is disclosed. The system includes a continuous reaction reactor for converting an input material using the input fluid so as to produce an effluent having an energy content of a first energy type. A plurality of compression stages are located in series with one another for compressing the input fluid in a stepwise manner so as to provide a pressurized reactor input stream to the continuous reaction reactor. A cascading effluent energy recovery system mechanically communicates with each of the plurality of compression stages. The cascading effluent energy recovery system imparts a portion of the energy content of the effluent into each of the plurality of compression stages so as to power that one of the plurality of compression stages.

In another embodiment of the present disclosure, a system utilizing an input fluid is provided. The system comprises a reactor for converting a material using the input fluid so as to produce an effluent having an energy content of a first energy type. The system also comprises a first early compression stage that includes a first early stage compressor for compressing the input fluid and a first early stage expansion turbine for recovering a portion of the energy content of the effluent. The first expansion turbine is mechanically linked to the first early stage compressor for at least partially driving the first compressor. A first motor/generator is mechanically linked to each of the first early stage compressor and the first early stage expansion turbine. The first motor/generator selectively powers the first early stage compressor during periods of insufficient power from the first early stage expansion turbine and converting an excess of the energy content into electricity during periods of excess power from the first early stage expansion turbine. A latter compression stage is located downstream from the first early compression stage and upstream from the reactor. The latter compression stage comprises a latter stage compressor for further compressing the input fluid and a latter stage expansion turbine for recovering a second portion of the energy content of the effluent. The latter stage expansion turbine is mechanically linked to the latter stage compressor for driving the latter stage compressor.

In yet another embodiment of the present disclosure, a method of providing a pressurized stream of an input fluid to a continuous reaction reactor so as to produce a non-pulsed effluent having an energy content is disclosed. The method includes the steps of receiving an input fluid and compressing the input fluid over a plurality of compression stages so as to produce the pressurized stream. The pressurized stream is provided to the continuous reaction reactor. A portion of the energy content of the effluent is recovered at each of the plurality of compression stages. Each portion of the energy content is used in compressing the input fluid at a corresponding respective one of the plurality of compression stages.

In a further embodiment, a method of providing a pressurized stream of al input fluid to a reactor so as to produce a non-pulsed effluent having an energy content is disclosed. The method includes the steps of receiving an input fluid and compressing the input fluid over a plurality of compression stages so as to produce the pressurized stream. The pressurized stream is provided to the reactor. A portion of the energy content of the effluent is recovered at each of the plurality of compression stages. The portion of the energy content at at least one of the plurality of compression stages is supplemented with additional energy to supplement the compressing of the input fluid.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein.

DETAILED DESCRIPTION

Figure 1:
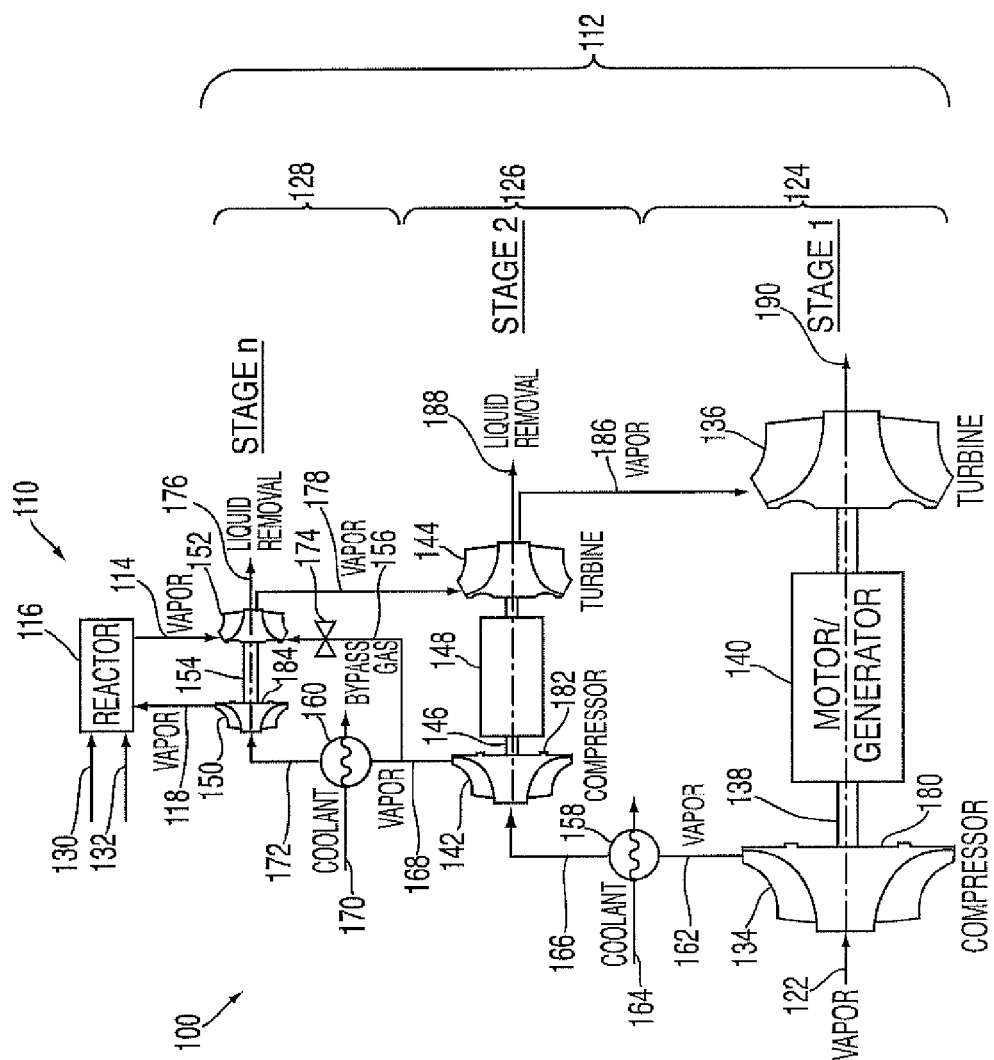
FIG. 1 is a schematic diagram of the components of a high-pressure system in accordance with the present disclosure.

Referring to the drawings, FIG. 1 illustrates an efficient high-pressure system 100. At a high level, system 100 includes a pressurized chemical reaction system 110 and a cascading energy recovery system 112. As can be readily seen in FIG. 1, cascading energy recovery system 112 interacts with pressurized system 110 to recover at least a portion of the initial energy content from effluent 114 and uses this energy to produce, or aid in producing, a high-pressure stream 118, e.g., air and/or steam, that is input into pressurized system 110 as part of the reaction process.

High-pressure system 100 includes a series of compression and expansion stages, here stages 124, 126, and 128, for compressing an input fluid 122, e.g., vapor and/or gas, through the series of stages to produce high-pressure stream 118 for reactor 116 on a compression side and for expanding effluent 116 through the series of stages to produce power for each associated stage on an expansion side. It is noted that while FIG. 1 shows three compression and expansion stages 124, 126, and 128, the present disclosure contemplates a lower or greater number of stages while keeping within the scope and spirit of the present disclosure. The number of compression and expansion stages utilized may depend upon the actual pressure requirements for high-pressure stream 118 and upon the actual energy content available from reactor effluent 114. Generally, three or more stages will typically be required to achieve necessary levels of pressure on the input side of pressurized chemical reaction system 110 and to successfully recapture high amounts of waste energy on the output side, as will be described below.

In the illustrative embodiment shown, pressurized chemical reaction system 110 includes a reactor 116 that may perform a continuous self-sustaining process for converting an uninterrupted continuous feed of input materials, as discussed further below, into effluent 114 with an initial energy content. The self-sustaining process of reactor 116 provides a thermally self-sustaining continuous flow of energy to system 100, wherein the reactor includes but is not limited to a supercritical water oxidation (SCWO) reactor, or other type of continuous chemical process reactor. In these cases, reactor 116 may be referred to as a "continuous reaction reactor." It is noted that the present disclosure also contemplates that reactor 116 may be of a "pulsed reaction" type in which the on going process involves a series of intermittent reactions, e.g., combustions. Examples of such pulsed reaction reactors include reciprocating type internal combustion engines, e.g., spark-ignition engines or diesel engines, among others. Input materials may include any of a variety of materials which may be treated and/or converted to usable end products, as will be discussed below.

FIG. 1 illustrates reactor 116 as an SCWO reactor in which SCWO reactions occur under high-pressure and high-temperature conditions. (Again, although the illustrated embodiment is directed to SCWO, those skilled in the art will readily appreciate that the scope of this disclosure covers systems beyond SCWO.) Reactor 116 may process a mixture of a feedstock 130, an additive 132, and high-pressure stream 118. Reactor 116 generally gasifiers the mixture of water and organics under hydrothermal treatment conditions to produce effluent 114 with the initial energy content. Effluent 114 may include a high-temperature and high-pressure gaseous mixture of steam and combustible gases containing particulates, salts and corrosive species, among other things. Moreover, effluent 114 may include compounds resulting from the broken chemical bonds of organics during the reaction in reactor 116. Additionally, reactor 116 may include mechanical systems and/or purging systems (not shown) for helping transport materials through the reactor.

Feedstock 130 generally includes organic wastes. Additive 132 may include one or more waste materials or fuel, including but not limited to, an oil-based hydrocarbon or diesel. Additive 132 may also include, but is not limited to, neutralizing agents to neutralize acids formed in reactor 116, inert solids to aid in salt transport, salt-forming agents, corrosion inhibitors, minerals, and combustible material for use as an auxiliary fuel. Generally, burning additive 132 helps maintain appropriate elevated temperatures in reactor 116 for the desired reactions. For example, elevated temperatures may generally be in the range of 350° Celsius to 800° Celsius, but are not limited to this range. High-pressure stream 118 generally includes pressurized steam and air for use in reactor 116.

As shown, the compression side of first stage 124 may include a first compressor 134 having a moderate pressure ratio, such as a pressurization in the range of but not limited to 2 to 9, for compressing input fluid 122. First compressor 134 may be mechanically linked with a first expansion turbine 136 of energy recovery system 112, e.g., via a first shaft 138 on the expansion side of first compression and expansion stage 124. First expansion turbine 136 generally powers first compressor 134 as effluent 114 expands through the turbine. The input: output pressure ratios for both first compressor 134 and first expansion turbine 136 are preferably chosen so as to balance the thrust to a reasonable first order, with residual thrust being handled by bearings or a thrust collar (not shown). Additionally, first compression and expansion stage 124 may also include a first motor/generator 140 coupled to first shaft 138 so as to selectively drive first compressor 134, either alone or in combination with first expansion turbine 136, during periods of insufficient power from the first expansion turbine or to generate electricity when the amount of energy needed to drive the first compressor is less than the energy recovered by the first expansion turbine.

The compression side of second compression and expansion stage 126 may include a second compressor 142 for further compressing/pressurizing input fluid 122, which may be received as a cooled second-stage input 166 as described below. Second compressor 142 is mechanically linked with a second expansion turbine 144, via a second shaft 146. Second expansion turbine 144 generally powers second compressor 142 as effluent 114 expands through the second turbine. Additionally, second compression and expansion stage 126 may also include a second motor/generator 148 coupled to second shaft 146 so as to selectively drive second compressor 142, either alone or in combination with second expansion turbine 144, during periods of insufficient power from the second expansion turbine or to generate electricity when the amount of energy needed to drive the second compressor is less than the energy recovered by the second expansion turbine.

Third compression and expansion stage 128 may include a third compressor 150 oil the compression side for yet further compressing input fluid 122 so as to produce high-pressure stream 118 that enters reactor 116. Third compressor 150 may be driven by a third expansion turbine 152 via a third shaft 154. In the present example, each compression and expansion stage 124, 126, 128 achieves a gain of approximately, but not limited to, 6 to 7 times in pressure exiting that stage relative to the input of that stage.

Since third turbine 152 of third compression and expansion stage 128 is the first of three expansion turbines 136, 144, and 152 to expand effluent 114, the third turbine will typically output sufficient power to drive third compressor 150 without the need of an associated motor/generator in the stage, as in first and second stages 124, 126. Moreover, typical optimal speeds of operation of the later compression stage(s), i.e., stage(s) closest to reactor 116, are so high that it is often problematic, at least under contemporary technology, to employ a motor rotating at such high speeds.

For startup of one or more later compression stages, i.e., the stage(s) closest to reactor 116, and/or where additional motive force in steady-state is needed, a motive system without additional rotating parts may be provided, e.g., in the form of a bootstrap, or bypass 156, that bypasses reactor 116 and utilizes pressurized flow from one or more lower stages, here, compression and expansion stages 124, 126. The bootstrap driving of third compression and expansion stage 128 by bypass 156 utilizes a portion of input fluid 122 after compression/pressurization by second compression and expansion stage 126. In other embodiments, e.g., one or more bootstrap drives similar to bypass 156 may replace the motor/generators of two or more stages after first compression and expansion stage 124 or other early compression stages.

Pressurized system 110 may also include one or more intercoolers, or heat exchangers, e.g., heat exchangers 158, 160, that may serve one or more purposes. For example, in some processes, inter-stage cooling of compressed input fluid 122 may be required to satisfy temperature requirements for a cycle. Inter-stage cooling helps achieve improved downstream stage compressor performance and thermodynamic efficiency. Additionally, lower temperatures allow compressors, such as compressors 134, 142, and 150, and related components to be constructed from less expensive materials and/or surface-coated with materials having lower temperature limits that provide less stringent design constraints. Alternatively, the material characteristics of the particular compressors and related components selected may require inter-stage cooling. Inter-stage cooling may be accomplished by providing heat exchangers 158, 160 between corresponding respective successive compression and expansion stages. For example, first heat exchanger 158 may be fluidly located between first compression and expansion stage 124 and second compression and expansion stage 126, and second heat exchanger 160 may be fluidly located between the second compression and expansion stage and third compression and expansion stage 128. Heat exchangers (intercoolers) 158 and 160 capture and remove heat and energy from the input fluid following compression and expansion at the corresponding respective compression and expansion stages. The removed heat and energy may be used within high-pressure system 100 as described below or elsewhere.

During operation of high-pressure system 100, input fluid 122 enters first compressor 134 at first compression and expansion stage 124. First compressor 134 imparts energy to input fluid 122 by raising tie pressure and temperature of the input fluid to produce a first-stage output 162 for introduction into second compressor 142 of second compression and expansion stage 126. As discussed below in more detail, first compressor 134 is powered by either first expansion turbine 136, first motor/generator 140, or both, depending upon the particular operating characteristics and state of operation of high-pressure system 100.

When first heat exchanger 158 is present, first-stage output 162 enters the first heat exchanger, wherein heat and energy is removed from the first-stage output, e.g., using a coolant 164. First heat exchanger 158 provides a cooled second-stage input 166 to second compressor 142. The heat and energy removed from first-stage output 162 may be utilized, e.g.,.to assist in pre-heating feedstock 130 and/or additive 132 for receipt by reactor 116, or for another purpose.

Cooled second-stage input 166 (or first-stage output 162 if first heat exchanger 158 is not present) enters second compressor 142 for additional compression so as to output a second-stage output 168 with a higher pressure and temperature than the cooled second-stage input. For example, if the output:input pressure ratio for first compressor 134 is slightly greater than 7, and the output:input pressure ratio for second compressor 142 is also slightly greater than 7, then an output: input pressure ratio of approximately 50 or more for the two stages together may be achieved. As discussed below in more detail, second compressor 142 is powered by either second expansion turbine 144, second motor/generator 148, or both, depending upon the particular operating characteristics of high-pressure system 100.

When second heat exchanger 160 is present, second-stage output 168 enters the second heat exchanger, wherein heat and energy is removed from the second-stage output, e.g., using a coolant 170. Second heat exchanger 160 provides a cooled third-stage input 172 to third compressor 150. The heat and energy removed from second-stage output 168 may be transferred to and utilized in another part of system 100 or used elsewhere.

Cooled third-stage input 172 (or second-stage output 168 if second heat exchanger 160 is not present) enters third compressor 150 for additional compression so as to output high-pressure stream 118. Which has a higher pressure and temperature than the cooled third-stage input. In one example, the output:input pressure ratio for first compressor 134 may be slightly greater than 7, the Output:input pressure ratio for second compressor 142 may be slightly greater than 7, and the output: input pressure ratio for third compressor 150 may be approximately 5, resulting in a combined output:input pressure ratio for the three stages of approximately 250, which if input fluid 122 has an initial pressure of about 14 psi results in high-pressure stream 118 having a pressure of about 3,500 psi.

It is noted that high-pressure system 100 may not include a heat exchanger (intercooler) downstream of third compressor 150. This is so because it may be desirable to retain the full temperature of high-pressure stream 118 exiting third compressor 150 (or other final stage(s) in other embodiments) in order to keep heat (enthalpy) in the system to promote the reaction in reactor 116. In any case, the materials from which the later stage compressor(s) are typically constructed must be able to operate for long periods of time at highly elevated temperatures. It is also noted that first, second, and third compressors, 134, 142, 150 are illustrated with progressively smaller impellers 180, 182, 184 respectively, to indicate that smaller physical dimensions of these machines may be needed due to higher gas density and to keep up with the peripheral speed of the respective compressor's rotating elements within the tolerances of the materials available for their construction.

Turning to the expansion side of cascading energy recovery system 112, in this illustrative embodiment third expansion turbine 152 expands effluent 114 to provide sufficient power to drive third compressor 150 generally without the need for additional power from an associated motor. (While this is true for this embodiment, it is to be understood that other embodiments may indeed include a motor/generator if needed or desired.) As mentioned above, during startup of high-pressure system 100, bypass 156 from downstream of second compressor 142 may be used to help drive third expansion turbine 152 along with effluent 114. Bypass 156 may be closed and/or the flow therein may be adjusted via a valve 174, e.g., a balancing valve or similar device, that may work in conjunction with one or more other devices (not shown), e.g., a timer, pressure sensor in the bypass, and/or a speed sensor associated with third expansion turbine 152 or third shaft 154, among others. Valve 174 may work to reduce bootstrap driving of third expansion turbine 152 as is appropriate as effluent 114 gains sufficient energy to drive the third expansion turbine.

Effluent 114 expands and cools through third expansion turbine 152. If effluent 114 contains a vapor, upon cooling some of the vapor may condense, resulting in a third-stage liquid output 176 and a third-stage vapor output 178 from third expansion turbine 152. In the context of SCWO, third-stage liquid output 176 will typically be principally water, entrained salts, and precipitants. Third-stage liquid output 176 may be removed via a liquid removal collector and channel (not shown). In the SCWO context, third-stage vapor output 178 typically includes simpler compounds produced in reactor 116 from feedstock 130. Due to the expansion through third expansion turbine 152, the removed compounds are at a reduced temperature and reduced pressure relative to effluent 114. Generally, third-stage vapor output 178 retains large amounts of energy in the form of elevated temperature and pressure, even with the temperature and pressure drop across third expansion turbine 152.

Third-stage vapor output 178 cascades into second expansion turbine 144 of second compression and expansion stage 126, where it expands and helps drive second compressor 142. If the power needed to drive second compressor 142 is greater than the power provided by second expansion turbine 144, second motor/generator 148 will act as a motor to help drive the second compressor. If, on the other hand, the power needed to drive second compressor 142 is less than the power provided by second expansion turbine 144, second motor/generator 148 may act as a generator to produce electricity. If the power requirement of second compression 142 and the power output by second expansion turbine 144 balance, second motor/generator 148 may not operate in either a motor or generator capacity. Third-stage vapor output 178 expands and cools in second expansion turbine 144 to produce a second-stage vapor output 186 and, typically, a second-stage liquid output 188, which may be removed via a liquid removal collector and channel (not shown). In the SCWO context, second-stage liquid output 188 may include simpler compounds produced from third-stage vapor output 178 in second expansion turbine 144. By virtue of the expansion through second expansion turbine 144, the removed compounds are at a reduced temperature and reduced pressure relative to third-stage vapor output 178. Second-stage output vapor 180 retains large amounts of energy in the form of elevated temperature and pressure, even with the temperature and pressure drop across second expansion turbine 144.

Second-stage vapor output 186 cascades into first expansion turbine 136 of first compression and expansion stage 124, where it expands and helps drive first compressor 134. If the power needed to drive first compressor 134 is greater than the power provided by first expansion turbine 136, first motor/generator 140 will act as a motor to help drive the first compressor. It on the other hand, the power needed to drive first compressor 134 is less than the power provided by first expansion turbine 136, first motor/generator 140 may act as a generator to produce electricity. If the power required by first compression 134 and the power output by first expansion turbine 136 balance, first motor/generator 140 may not operate in either a motor or generator capacity. First expansion turbine 136 expands and cools second-stage vapor output 186 to produce a first-stage output 190, which may include vapors and liquid of lower temperature and pressure and suitable for final energy extraction with a heat exchanger (not shown) or for inputting to a separator (not shown) that isolates the components of the effluent for disposal or other use, such as fuel for reactor 116 or elsewhere.

Figure 2:
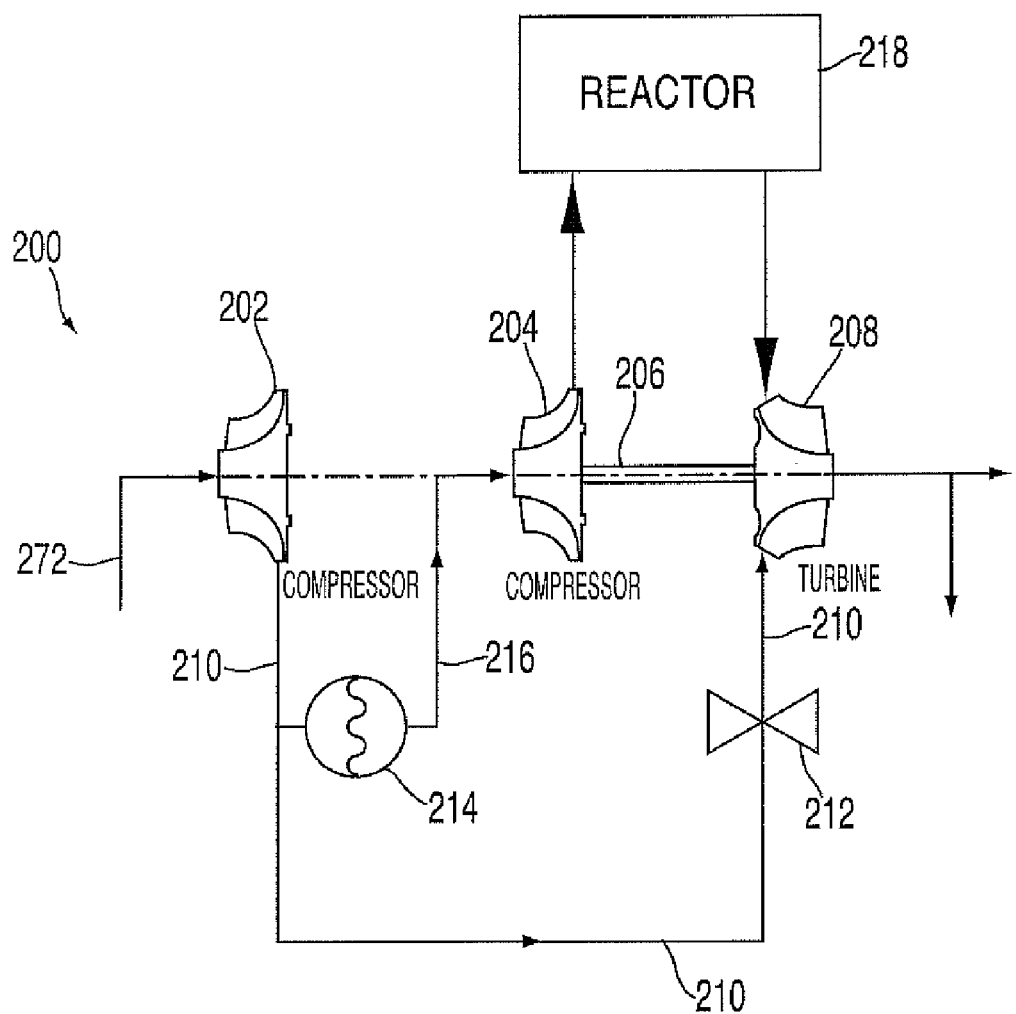
FIG. 2 is a schematic diagram of a later compression stage of a high-pressure system in accordance with the present disclosure.

FIG. 2 illustrates an alternative embodiment of a latter compression and expansion stage 200, generally a stage located directly upstream or closest to a reactor 218, of the present disclosure. Generally, latter compression and expansion stage 200, e.g., third compression and expansion stage 128 in the illustrative embodiment of FIG. 1, may include a latter stage compressor 202 and an additional compressor 204 mounted on, e.g., a common shaft 206 that may also be shared with a respective latter stage expansion turbine 208. Additional compressor 204 may provide additional compression of an input 272 from a previous stage to stage 200, e.g., cooled third-stage input 172 of FIG. 1, when required by process requirements. Latter stage expansion turbine 208 may receive a bootstrap bypass drive stream 210 from latter stage compressor 202. A valve 212 may be provided for controlling the flow of bypass drive stream 210 into latter stage expansion turbine 208. A heat exchanger 214 may be included to reduce the temperature of a portion of bypass drive stream 210 to provide a cooled drive stream 216 to drive additional compressor 204. The heat and energy recovered by heat exchanger 214 may be used, e.g., to preheat materials supplied to a reactor 218 or for other purposes in the corresponding system (not shown).

As will be appreciated, ally stage of a high-pressure system made in accordance with the present disclosure, such as any one of first, second, and third compression and expansion stages 124, 126, 128 of high-pressure system 100 of FIG. 1, may include multiple compressors in the manner illustrated in FIG. 2, while keeping within the scope and spirit of the present disclosure. Multiple compressors in a stage of such a system may improve that stage's efficiency and reduce mechanical stress on each compressor.

Moreover, it will be appreciated that the use of a multiplicity of turbocharger-type stages to provide a pre-reaction compression process may be desirable for use with other reaction systems that utilize supercritical water oxidation. In any such system the compression arrangement of the present disclosure achieves various beneficial results, such as reduced size of motor/generators needed, elimination of positive displacement equipment, the availability of design methodologies for radial flow compressors and turbines, minimal interfacing with an external electric grid, reduction in size of the compression and energy recovery systems, and simplification of maintenance.

Exemplary embodiments have been disclosed above and illustrated in the accompanying drawings. It will be understood by those skilled in the art that various changes, omissions and additions may be made to that which is specifically disclosed herein without departing from the spirit and scope of the present disclosure.

What is claimed is:

1. A system utilizing an input fluid, comprising:
   a continuous reaction reactor for converting an input material using the input fluid so as to produce an effluent having an energy content of a first energy type; and
   a plurality of compression stages, located in series with one another, for compressing the input fluid in a stepwise manner so as to provide a pressurized reactor input stream to said continuous reaction reactor;
   a cascading effluent energy recovery system mechanically communicating with each of said plurality of compression stages, said cascading effluent energy recovery system for imparting a first portion of said energy content of said effluent into each of said plurality of compression stages so as to power that one of said plurality of compression stages; and
   a bootstrap bypass extending from said plurality of compression stages to said cascading effluent energy recovery system so as to bypass said continuous reaction reactor and provide a compressed version of said input fluid directly to said cascading effluent energy recovery system.

2. The system of claim 1, wherein each of fewer than all of said plurality of compression stages includes an energy converting device for selectively powering that one of said plurality of compression stages during periods of insufficient power from said cascading effluent energy recovery system or converting an excess of said portion of said energy content into a second energy type different from said first energy type during periods of excess power from said cascading effluent energy recovery system.

3. The system of claim 2 wherein said energy converting device directly selectively powers said one of said plurality of compression stages.

4. The system of claim 2, wherein said energy converting device comprises a motor/generator.

5. The system of claim 1, wherein said plurality of compression stages includes a corresponding respective plurality of compressors and said cascading effluent energy recovery system includes a plurality of expansion turbines for respectively driving said plurality of compressors.

6. The system of claim 1, wherein each of fewer than all of said plurality of compression stages includes an energy converting device for selectively powering the corresponding one of said plurality of compressors during periods of insufficient power from the corresponding one of said plurality of expansion turbines or converting an excess of said portion of said energy content into a second energy type different from said first energy type during periods of excess power from the corresponding one of said plurality of expansion turbines.

7. The system of claim 6, wherein said energy converting device comprises a motor/generator.

8. The system of claim 1, wherein said plurality of compression stages includes at least three compression stages.

9. The system of claim 1, further comprising a heat exchanger fluidly located between successive ones of said plurality of compression stages, said heat exchanger for removing heat from the input fluid.

10. The system of claim 1, wherein said bootstrap bypass includes a valve for controlling flow of said compressed version of said input fluid.

11. The system of claim 1, wherein said plurality of compression stages includes a latter stage upstream of said continuous reaction reactor, said latter stage having a latter stage compressor and said cascading effluent energy recovery system having a latter stage expansion turbine for driving said latter stage compressor, said bootstrap bypass extending from a bypass tap in said plurality of compression stages prior to said latter stage to said latter stage expansion turbine.

12. The system of claim 11, further comprising a heat exchanger located between said bypass tap and said latter stage compressor.

13. The system of claim 1, wherein said plurality of compression stages includes a latter stage immediately upstream of said continuous reaction reactor, said latter stage having first and second latter stage compressors in series with one another, and said cascading effluent energy recovery system having a latter stage expansion turbine for driving said first and second latter stage compressors, said bootstrap bypass extending from a bypass tap in said first latter stage compressor to said latter stage expansion turbine.

14. The system of claim 13, further including a valve located in said bootstrap bypass for controlling flow of the input fluid to said latter stage expansion turbine.

15. The system of claim 13, wherein said bootstrap bypass includes a heat exchanger having a heat-exchanger input from said first latter stage compressor, said heat exchanger for removing heat from said heat-exchanger input so as to produce a cooled output.

16. The system of claim 15, further comprising a secondary line for providing at least a portion of said cooled output to said second latter stage compressor.

17. The system of claim 1, wherein said continuous reaction reactor comprises a supercritical water oxidation reactor.

18. A system utilizing an input fluid, comprising:
   a reactor for converting a material using the input fluid so as to produce an effluent having an energy content of a first energy type;
   a first early compression stage comprising:
      a first early stage compressor for compressing the input fluid;
      a first early stage expansion turbine for recovering a first portion of said energy content of said effluent, said first early stage expansion turbine mechanically linked to said first early stage compressor for at least partially driving said first compressor; and
      a first motor/generator mechanically linked to each of said first early stage compressor and said first early stage expansion turbine, said first motor/generator selectively powering said first early stage compressor during periods of insufficient power from said first early stage expansion turbine and converting an excess of said energy content into electricity during periods of excess power from said first early stage expansion turbine;
   a latter compression stage located downstream from said first early compression stage and upstream from said reactor, said latter compression stage comprising:
      a latter stage compressor for further compressing the input fluid; and a latter stage expansion turbine for recovering a second portion of said energy content of said effluent, said latter stage expansion turbine mechanically linked to said latter stage compressor for driving said latter stage compressor; and a bootstrap bypass extending from a bypass tap located upstream from said latter stage compressor to said latter stage expansion turbine for providing at least a portion of the input fluid to said latter stage expansion turbine.

19. The system of claim 18, wherein said reactor comprises a continuous self-sustaining chemical process reactor for converting a continuous feed of said input material in a continuous reaction.

20. The system of claim 18, wherein said continuous reaction reactor comprises a supercritical water oxidation reactor.

21. The system of claim 18, wherein said reactor comprises a pulsed reactor for converting an intermittent feed of the input material in a pulse reaction.

22. The system of claim 21, wherein said reactor comprises an internal combustion engine.

23. The system of claim 21, wherein said reactor comprises a diesel engine.

24. The system of claim 18, further including a second early compression stage located downstream of said first early compression stage and upstream of said latter compression stage, said second early compression stage comprising:

a second early stage compressor for further compressing the input fluid relative to said first compressor;

a second early stage expansion turbine for recovering a third portion of said energy content of said effluent, said second early stage expansion turbine mechanically linked to said second early stage compressor for at least partially driving said second early stage compressor; and a second motor/generator mechanically linked to each of said second early stage compressor and said second early stage expansion turbine, said second motor/generator selectively powering said second early stage compressor during periods of insufficient power from said second early stage expansion turbine or converting an excess of said energy content into electricity during periods of excess power from said second early stage expansion turbine.

25. The system of claim 18, further comprising at least one heat exchanger located downstream from said first early stage compressor and upstream from said latter stage compressor, said at least one heat exchanger for removing heat from the input fluid following compression of the input fluid.

26. The system of claim 18, wherein said bootstrap bypass including a balancing valve for controlling flow of the input fluid from said bypass tap to said latter stage expansion turbine.

27. The system of claim 18, further comprising a heat exchanger located downstream from said bypass tap and upstream from said latter stage compressor.

28. The system of claim 18, wherein said latter stage includes an additional compressor in series with said latter stage compressor, said latter stage expansion turbine driving said latter stage compressor and said additional compressor and said bootstrap bypass extending from said bypass tap in said additional compressor to said latter stage expansion turbine.

29. The system of claim 18, further including a balancing valve located in said bootstrap bypass upstream from said latter stage expansion turbine for controlling flow of the input fluid to said latter stage expansion turbine.

30. A method of providing a pressurized stream of an input fluid to a continuous reaction reactor so as to produce a non-pulsed effluent having an energy content, comprising:

receiving an input fluid;

compressing said input fluid over a plurality of compression stages so as to produce the pressurized stream;

providing the pressurized stream to the continuous reaction reactor;

recovering a portion of the energy content of the effluent at each of said plurality of compression stages; and using each said portion of the energy content in compressing said input fluid at a corresponding respective one of said plurality of compression stages;

wherein said series of compression stages comprises a latter stage that includes a latter stage expansion turbine for driving a latter stage compressor, the method further comprising bootstrap bypassing at least a portion of said input fluid past said reactor to said latter stage expansion turbine so as to at least partially drive said latter stage compressor.

31. The method of claim 30, wherein the step of recovering a portion of the energy content of the effluent at each of said plurality of compression stages includes passing at least a portion of the effluent through an expansion turbine.

32. The method of claim 31, wherein the step of compressing said input fluid over a plurality of compression stages includes passing said input fluid through a series of compressors, said expansion turbine at each of said plurality of compression stages at least partially driving a corresponding one of said series of compressors.

33. The method of claim 30, further comprising a step of supplementing said portion of the energy content of the effluent at each of fewer than all of said plurality of compression stages with additional power for compressing said input fluid or converting an excess of said portion of the energy content into another form of energy.

34. The method of claim 33, wherein the step of supplementing or recovering includes, respectively, externally powering an electric motor/generator and driving said motor/generator with said excess.

35. The method of claim 33, wherein the step of recovering a portion of the energy content of the effluent at each of said plurality of compression stages includes passing at least a portion of the effluent through an expansion turbine.

36. The method according to claim 30, further comprising a step of removing heat from said input fluid after one or more of said plurality of compression stages.

37. A method of providing a pressurized stream of an input fluid to a reactor so as to produce an effluent having an energy content, comprising:

receiving an input fluid;

compressing said input fluid over a plurality of compression stages so as to produce the pressurized stream;

providing a first portion of the pressurized stream to a reactor;

bootstrap bypassing the reactor with a second portion of the pressurized stream;

recovering a portion of the energy content of the effluent at each of said plurality of compression stages;

using each said portion of the energy content in compressing said input fluid at a corresponding respective one of said plurality of compression stages; and supplementing said portion of the energy content at at least one of said plurality of compression stages with additional energy to supplement the compressing of said input fluid;

wherein said supplementing includes allowing the second portion of the pressurized stream in a latter-stage expansion turbine to expand so as to supplement the compressing of said input fluid in a latter-stage compressor of said plurality of compression stages that is mechanically linked to said latter-stage expansion turbine.

38. The method of claim 37, wherein the step of supplementing said portion of the energy content includes using an electric motor.

39. The method of claim 37, wherein the step of providing the pressurized stream to a reactor comprises providing the pressurized stream to a continuous reaction reactor.

40. The method of claim 39, wherein the step of providing the pressurized stream to a reactor comprises providing the pressurized stream to a supercritical water oxidation reactor.

41. The method of claim 37, wherein the step of providing the pressurized stream to a reactor comprises providing the pressurized stream to a pulse reaction reactor.

42. The method of claim 41, wherein the step of providing the pressurized stream to a reactor comprises providing the pressurized stream to an internal combustion engine.

43. The method of claim 42, wherein the step of providing the pressurized stream to a reactor comprises providing the pressurized stream to a diesel engine.

* * * * *